INVENTOR.
Preston F. Pew

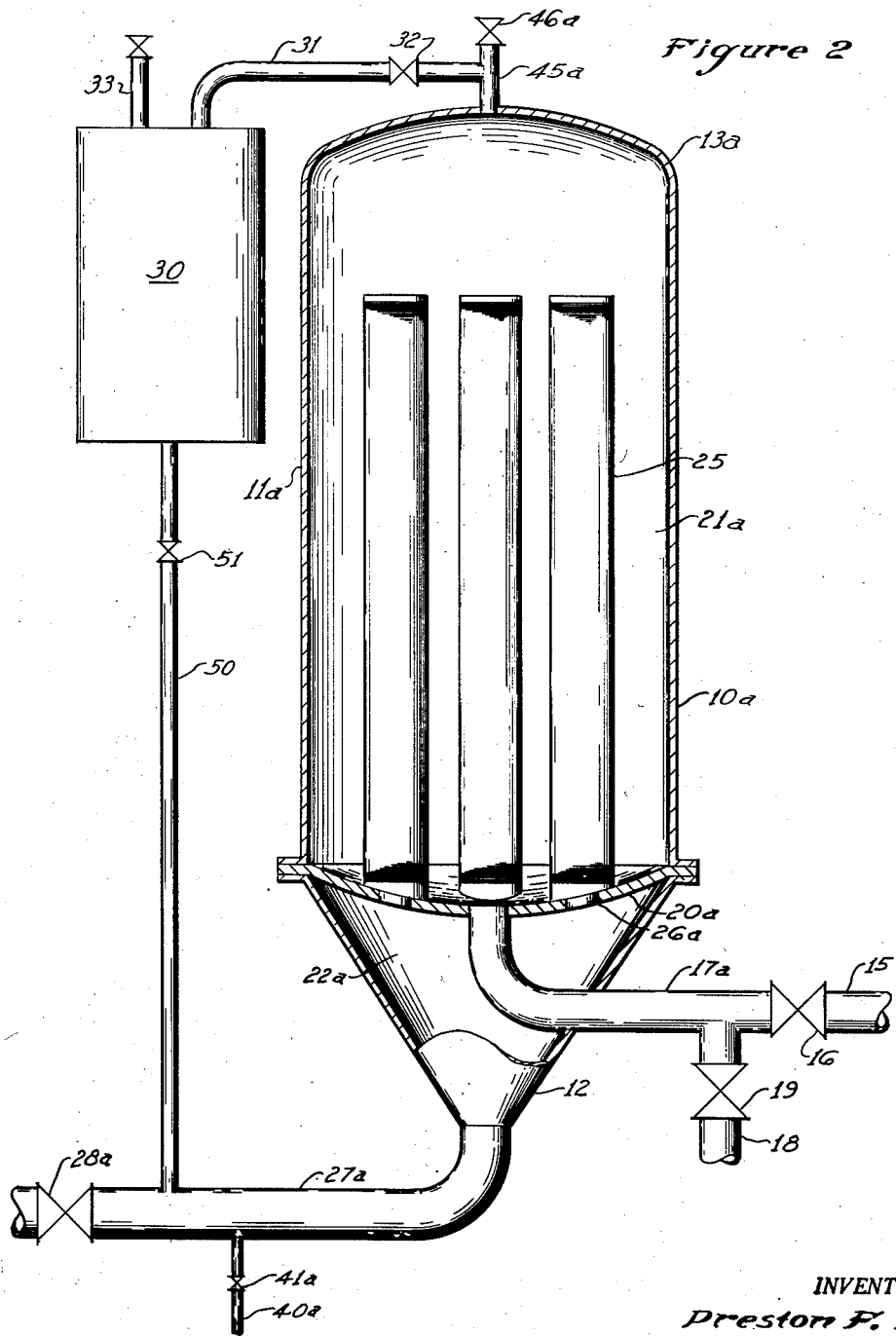

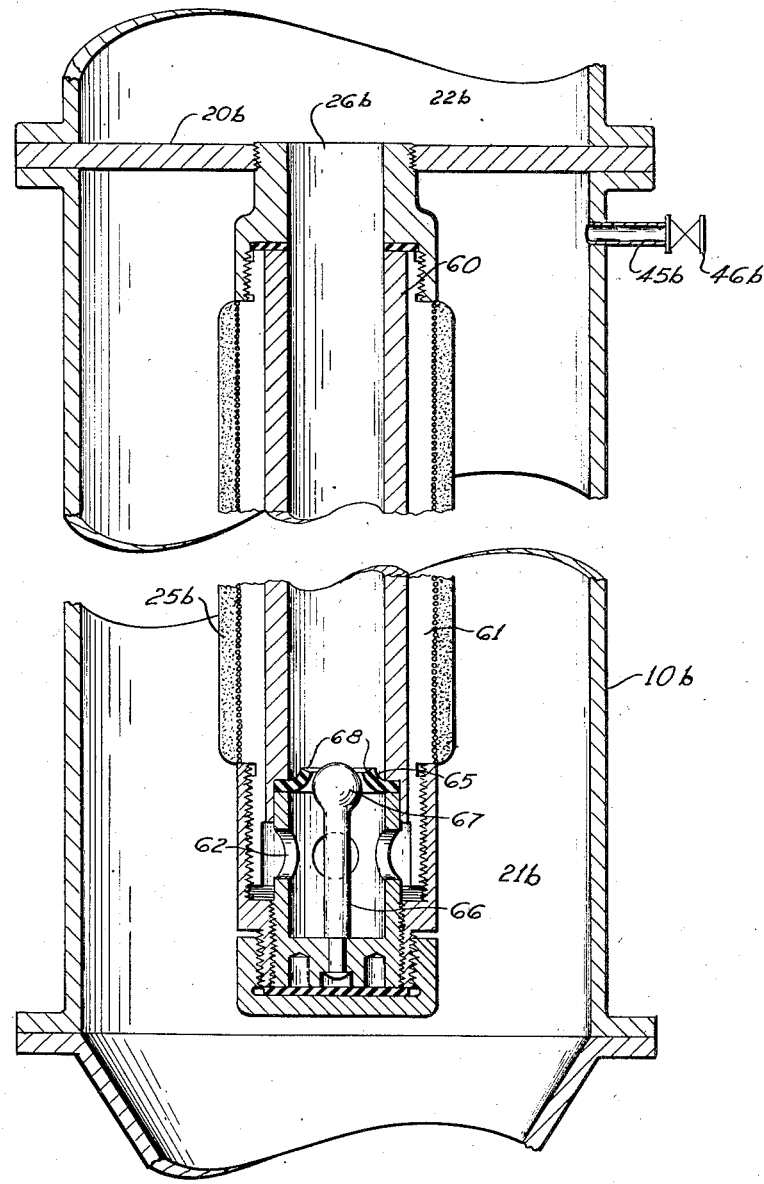

United States Patent Office 2,780,363
Patented Feb. 5, 1957

2,780,363

APPARATUS AND PROCESS FOR WASHING DIATOMITE TYPE FILTERS

Preston F. Pew, Tucson, Ariz., assignor to Infilco Incorporated, Tucson, Ariz., a corporation of Delaware Application December 22, 1952, Serial No. 327,341

5 Claims. (Cl. 210—144)

This invention relates to filters of the type wherein the liquid is filtered through one or more filter elements, comprising a permeable, rigid foundation, on which a filter cake, or coat, of filter aid material, such as, for example, diatomaceous earth, is deposited. More particularly, the invention is concerned with the cleaning of the elements of such filters.

In accordance with general practice, filters of this type will sometimes be referred to herein as "diatomite filters," but it should be understood that this term is used in a generic sense and without limitation to any specific filter aid material or filter construction.

In operation of diatomite filters it is necessary to periodically interrupt filtering and clean the filter elements when, due to the solids retained, the porosity of the cake drops below a predetermined value. Various methods of carrying out the cleaning of such filter elements have been suggested, such as a reversal of flow through the elements, or jets of liquid along the outside of the elements. More recently, air under pressure has frequently been employed, usually in the manner suggested in Patent No. 2,423,172. My invention relates to an improved method and means for cleaning diatomite filters.

It is an object of this invention to provide an improved apparatus for, and a method of, cleaning the filter elements of diatomite filters, wherein all parts of the elements are washed uniformly.

Another object is to provide an apparatus and method for cleaning filter elements, wherein the wash liquid is discharged with high velocity into a body of air.

Another object is to provide an improved system for cleaning the elements of a diatomite filter wherein the air used in the cleaning operation is compressed and so confined as to preclude its escape during filtering.

Another object is to provide an apparatus and method for cleaning filter elements wherein the air or other gas used in the cleaning operation is out of contact with the liquid during filtering, thus preventing its absorption by the liquid.

Another object is to provide an apparatus and method utilizing air for cleaning filter elements, wherein valuable liquids being filtered can be recovered without contamination by filter aid material.

Another object of the invention is to provide, in a filter of the type referred to, means for draining the liquid on the upstream side of the elements while preventing the liquid within the elements and on the downstream side of the elements from disturbing the filter cake by backflow through the element.

Still another object of the invention is to provide a diatomite filter equipped for a high velocity wash utilizing a compressible gas and adapted to intermittent filtering operation.

Another object of the invention is to provide means associated with a diatomite filter operative to retain the filter aid coat on the element during interruption of flow through the filter, without draining of the filter.

Other objects will become apparent upon consideration of the detailed description and of the claims which follow.

In the filter cleaning method disclosed in said Patent No. 2,423,172, air is trapped in the filter by the liquid flowing from the filter inlet to the filter outlet and is compressed under inlet pressure. One volume of air is compressed in the space below the plate which customarily supports the elements, the upper part of the elements below the plate being made impervious to prevent escape of the air through the elements. Another volume of air is compressed in the top portion of the filter. When the first volume of air is released by opening a quick-acting valve, the second volume of air expands and drives the water in the upper part of the filter and in the elements outwardly through the porous walls of the elements at a very high velocity.

This so-called "air bump" wash is much more effective than a reverse flow wash in breaking the filter cake off the elements and removing dirt that has penetrated the interstices of the element. However, in practice, certain difficulties have been encountered. To prevent the air trapped under the element supporting plate from escaping during the filter run, the seals between the plate and the filter body and between the plate and the elements must be air-tight. In spite of careful and expensive construction the air has sometimes been lost, resulting in failure of the air bump wash. This may be due, at least in part, to the fact that the air trapped under the plate is in contact with the liquid flowing through the filter during the entire filter run, and part or all of it may be gradually absorbed by the liquid.

Further, in air bump washing according to said patent the filter is full of liquid at the start of the washing operation, except for the two air-filled spaces underneath the plate and the top of the filter. This has several drawbacks. The liquid in the filter becomes contaminated by the washed-off filter aid material and dirt and must be wasted, or treated to remove the contaminating matter, before it can be returned to the filter inlet. When filtering a valuable liquid, this may involve a serious loss, or the inconvenience and expense of additional treatment. Further, to effectively clean the elements, the expanding air in the top of the filter must drive the liquid in the filter head and elements at a very high velocity through the porous element walls over their full length. In the usual air bump washing the body of liquid surrounding the element must be moved by the liquid discharging through the element. It has been observed that, upon releasing the air trapped in the space under the plate, there is a sudden rush of liquid into this space, but since this space is necessarily small, the movement is very limited. Under these circumstances the high velocity wash stops short of completion, and frequently the elements are not properly cleaned.

In the intermittent operation of diatomite filters the filter aid cake breaks away from the elements when the inlet pressure is shut off and must be reformed before filtering can be resumed. To prevent this breaking away of the cake, it has been suggested by Baily, in Patents Nos. 2,496,370 and 2,595,913, that, upon the termination of inflow to the filter, the outflow be continued by siphoning, until the filter is drained down to the bottom of the elements. Such draining of the filter is often inconvenient; furthermore, a rather complicated construction is needed for the procedure of Baily. I have found that it is not necessary to drain the filter in order to retain the filter coat upon termination of inflow and that much simpler means can be used for holding the cake firmly to the element when flow is interrupted.

The apparatus and method of my invention are designed to eliminate the drawbacks of the methods previously used and provide more reliable and uniform cleaning of the elements, as well as improved intermittent operation. In my apparatus the air for operating the wash process is stored under pressure in a separate leakproof compartment outside the filter, and out of contact with the liquid during filtering. The air compartment may be filled by displacing the air from the filter tank by the liquid to be filtered flowing into the tank, or alternatively, compressed air may be supplied to the air compartment from some outside source. This method of air storage has the advantage that the air cannot escape through leaky seals or the like, nor can it be absorbed by the liquid during the filter run. There is, therefore, always a sufficient quantity of air available for washing. Further, since air for release is not stored in the filter, the entire length of the filter elements can be pervious and utilized for filtering, permitting use of a smaller filter for the same filtering capacity.

In my process the liquid in the filter inlet chamber is drained at the end of the filter run and prior to washing. During draining, backflow of the liquid in the elements and filter head is prevented. In the preferred embodiment of the invention, a slight vacuum is maintained on the liquid within the elements and the filter head, just sufficient to prevent backflow through the element into the inlet chamber, but insufficient to draw off any substantial quantity of liquid. In practice I have found a vacuum of less than one-half pound per square inch ample for this purpose. Only after all the liquid in the inlet chamber has been drained therefrom and the elements are surrounded by air, is the operating air allowed to expand. By operating in this manner the liquid in the inlet chamber, which may be valuable, is not contaminated by filter aid material and dirt, and can be returned to the filter inlet without previous treatment.

Further, and most important, since the liquid driven through the elements by the expanding air is discharged into a body of air, much less liquid must be accelerated than in conventional "air bump" practice, where also the body of liquid surrounding the elements must be accelerated to make the discharge of the washing liquid possible. Therefore, a much higher velocity is attained, resulting in better washing of the elements.

The invention will be more readily understood from consideration of the drawings which form a part hereof and wherein like reference characters designate similar elements.

Figure 2 is a similar view of a different filter equipped for cleaning according to the preferred form of the invention; and Figure 3 is a partial vertical cross-sectional view of a filter element equipped for cleaning according to another form of the invention.

Figure 1:
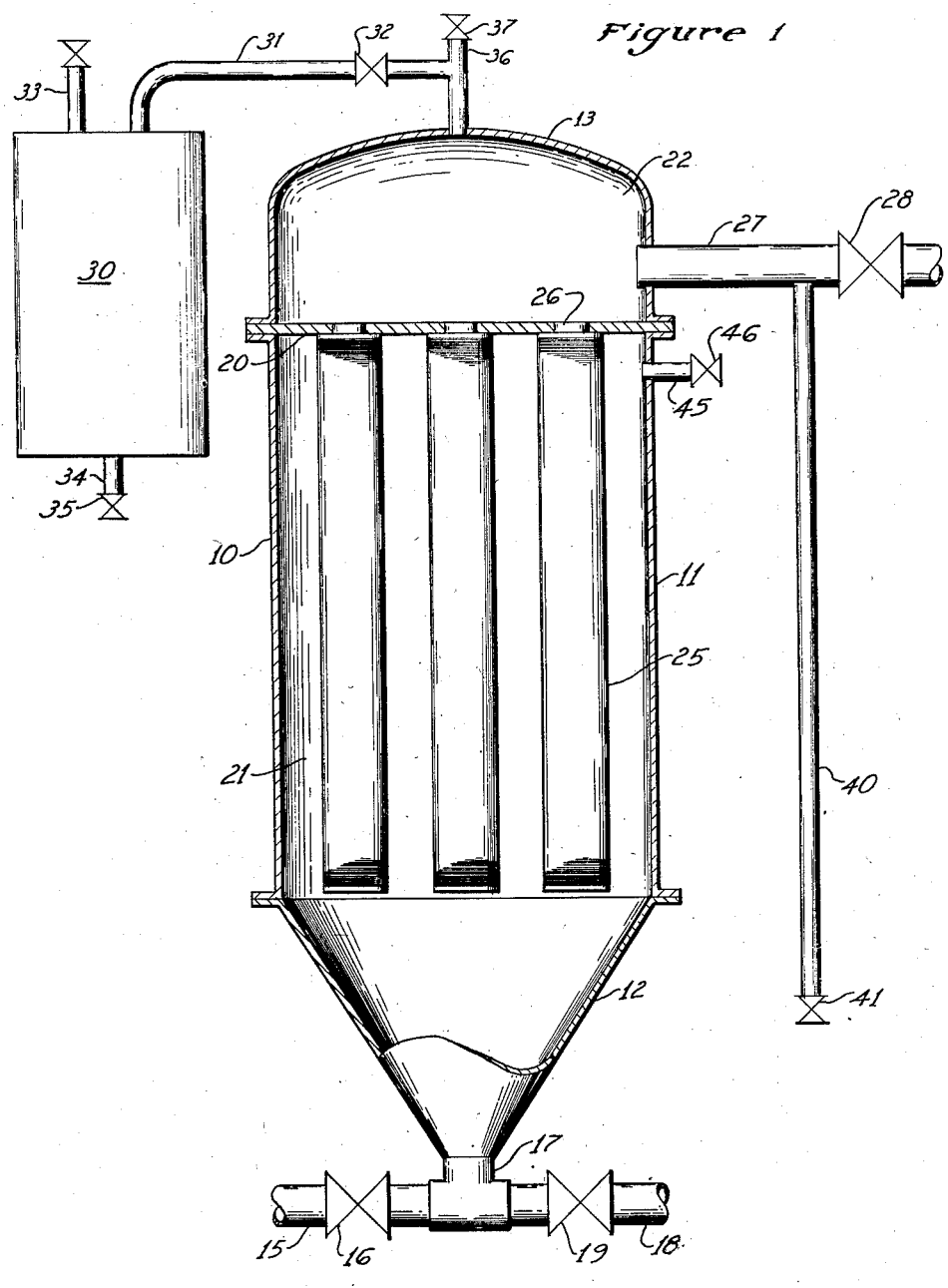
Figure 1 is a diagrammatic vertical cross-sectional view, partly in elevation, showing a filter equipped for cleaning according to the preferred form of the invention.

The filter shown in Figure 1 comprises a casing or tank 10, which may be of any convenient shape. Preferably, however, the tank 10 has a cylindrical wall 11, and a hopper bottom 12 and a cover 13 flanged to the lower and upper end, respectively, of the wall 11. An inlet conduit 15, provided with an inlet valve 16, is connected to the bottom 12 of the casing 10, by a conduit 17, which also connects a drain 18, provided with a drain valve 19, to the bottom of the filter.

A partition, or plate, 20 extends across the housing 10 and may be fastened thereto by any suitable means, as by clamping the plate 20 between the flanges of the wall 11 and the cover 13. The plate 20 divides the housing into a lower inlet chamber 21 and an upper outlet chamber 22. Depending on the size of the filter, one or more filter elements 25 are supported by the plate 20 and extend therefrom into the inlet chamber 21. The elements may be of any suitable type, but are shown for purposes of illustration as being formed by wire wound helically around a cage or former as described in the patent to Paterson et al., Patent No. 2,347,927. For each element 25 a port 26 is provided in the plate 20 and registers with the interior of the element. Thus, a passageway is formed from the inlet chamber 21 to the outlet chamber 22 through each of the elements 25. To prevent liquid from by-passing these passageways, the elements must be sealed water-tight to the plate 20, but since there is no air stored underneath the plate, the seals need not be air-tight. The elements are made pervious, and therefore utilized for filtering, for their full length. A filtered liquid outlet conduit 27 leads from the outlet chamber 22 and is provided with a valve 28.

The filter described above is not new and not claimed herein, except insofar as it cooperates with the novel means for carrying out the new process of filter cleaning.

A gas storage tank 30 is connected to the filter 10 through a gas conduit 31 extending through the top 13 of the filter. The conduit 31 is provided with a valve 32. The tank 30 may also be provided with a valved gas inlet conduit 33 leading from a suitable outside source of gas under pressure, not shown. A drain 34 provided with a valve 35 permits draining liquid from the gas tank. A vent 36, provided with a valve 37, branches from the gas conduit 31, as shown.

Means are provided for applying a slight vacuum to the liquid in the outlet chamber 22 and the elements 25. These means may take any suitable form, such as a small vacuum pump, or an aspirator, connected with its suction line to the outlet chamber 22. In the drawings I have shown, for purposes of illustration, a small siphon pipe 40 provided with a valve 41, branching off from the outlet conduit 27, upstream of valve 28, and extending downwardly to an elevation below the lower end of the filter elements 25, as shown. The diameter of the pipe 40 can be quite small, as only a very slight vacuum is necessary to prevent a backflow of the liquid in the outlet chamber and in the elements during draining of the inlet chamber 21. For certain purposes, to be discussed below, it may be desirable to keep the siphon valve also open during filtering, and this is permissible, because the quantity of liquid wasted therethrough during filtering is negligible, or, when the liquid is valuable, it may be returned to the filter inlet. A vent 45 provided with a vent valve 46 leads from the upper part of the inlet chamber 21.

In operation, coating of the elements with filter aid material and filtering are carried out in conventional manner. However, when the filter 10 is first filled with liquid after a washing operation, all valves, except the inlet valve 16 and the valve 32 on the gas conduit 31, are closed. The liquid rising in the tank displaces the air therefrom and compresses it under inlet pressure in the gas compartment or tank 30. The tank 30 is made of sufficient size that no air remains in the outlet chamber 22 and conduit 31 upstream of valve 32. To insure that no gas remains upstream of valve 32, I prefer to permit a small amount of liquid to enter the gas tank 30. This liquid can later be drained through pipe 34, after the air has been released from the tank 30 at the start of the washing operation. When the filter 10 is completely filled with liquid, contact between the air or other gas compressed in the tank 30 and the liquid in filter 10 is broken by closing the valve 32 on gas conduit 31. Thereafter, the filter run is started by opening the filtered liquid outlet valve.

Filtering now proceeds until the loss of head through the filter has reached a predetermined value. Before stopping the filter run, any air accumulated in the filter head 22 during the filter run is vented through vent 36. Thereafter, the siphon valve 41 is opened, the outlet valve 28 is closed, and, finally, the inlet valve 16 is closed. Then the liquid in the inlet chamber 21 is drained by opening the vent valve 46 and the drain valve 19.

With the siphon valve 41 open, a slight vacuum is applied to the liquid in the outlet chamber 22 and the elements 25. Therefore, while the liquid in the inlet chamber 21 drains through the drain 18, the liquid in the outlet chamber 22 and in the elements 25 is prevented from disturbing the filter coat by backflow through the elements into the inlet chamber. Thus, the liquid withdrawn through drain 18 is not contaminated with filter aid material and filtered out dirt and need not be wasted, but can be sent back to the filter inlet 15 without previous treatment. This is important when filtering valuable liquids.

When the liquid upstream of the elements has been drained, the filter is ready for washing. It will be understood that at this time the elements are surrounded by a body of air, the coat of filter aid material still clings to the elements, and the elements and outlet chamber are filled with liquid. The siphon valve 41 is now closed and the valve 32 on gas conduit 31 is opened, the vent valve 46 and the waste valve 19 remaining open. As soon as the valve 32 is opened, the air compressed in tank 30 expands and drives the liquid in outlet chamber 22 and elements 25 with high velocity through the previous walls of the filter elements. The wash liquid breaks off the filter aid cake and dislodges dirt from the pores of the filter element and carries them away through the drain 18. Due to the fact that the wash liquid is discharged into air, which can be readily displaced and escape through the open vent valve 46, a very high velocity of the wash liquid is obtained, and the elements are thoroughly cleaned. When all the liquid has been drained, the filter is ready for a new filling, as described above.

If, for any reason, the filter run is interrupted before washing is necessary, the filter aid coat can be held firmly to the elements, without draining the filter, by opening the siphon valve 41 just enough to permit a slight flow therethrough. Since the siphon tube 40 is very small, the quantity of liquid wasted therethrough is negligible. However, I have found that even such a mere trickle is sufficient to keep the filter aid coat firmly on the elements during the time when it is not subjected to inlet pressure, and that, when operating in this manner, it is not necessary to drain the filter in order to retain the coat. In cases where occasional or regular interruptions of filter runs are contemplated, it may be convenient to leave the siphon valve open during filtering.

Where compressed air is readily available, the construction can be simplified and the cost of the plant reduced by omitting the gas storage tank 30 and connecting the conduit 31 to the supply of compressed air. Further, where the character of the liquid being filtered does not permit contact with any air, any suitable gas can be compressed and used for filter cleaning in this manner, or by introducing it into the storage tank 30 through gas inlet conduit 33. When filtering such a liquid, vent 45 will also be connected to a source of a suitable gas at the end of the filter run, and gas under regulated pressure, not in excess of atmospheric pressure, will be allowed to enter the inlet chamber as the liquid is drained therefrom.

When operating with compressed air or other gas from an outside supply, the valve 32 on the gas conduit 31 is kept closed during filling of the filter, and vent valves 46 and 37 are held open until the liquid reaches their levels.

Figure 2 shows the invention as applied to a diatomite filter of somewhat different construction. The filter casing 10a has a cylindrical wall 11a and a closed top 13a, which may be removable, as shown in Figure 1, or integral, as shown in Figure 2. A hopper bottom 12 is flanged to the lower end of the wall 11a, as shown. In this embodiment the partition 20a is in the form of a dished plate which is clamped between the lower end of the cylindrical wall 11a and the hopper bottom 12, and divides the filter into an upper inlet chamber 21a and a lower outlet chamber 22a. Any suitable number of elements 25 extend upwardly from, and are supported by, the plate 20a. Ports 26a in the plate 20a register with the elements 25 to provide a passageway from the inlet chamber 21a to the outlet chamber 22a. An inlet conduit 15 for liquid to be filtered, provided with an inlet valve 16, is connected through a conduit 17a with the inlet chamber 21a, as shown. A drain 18, provided with a drain valve 19, is also connected by the conduit 17a with the inlet chamber 21a. A filtered water outlet conduit 27a, provided with an outlet valve 28a, leads from the outlet chamber 22a.

As in the embodiment of Figure 1, I provide means for applying a slight vacuum to the liquid in the outlet chamber 22a and the elements 25, in the form of a small siphon pipe 40a, provided with a valve 41a, leading from the filtered water outlet conduit 27a upstream of valve 28a. A gas storage tank 30 is connected to the top of the filter 10a by a conduit 31, provided with a valve 32, and is also connected to the outlet chamber 22a through a conduit 50, provided with a valve 51. The conduit 50 can discharge directly into the outlet chamber 22a, or, as shown, into the filtered liquid outlet conduit 27a. The tank 30 may also be provided with a valved gas inlet 33, leading from an outside supply of compressed gas, not shown. A vent 45a, provided with a valve 46a, leads either directly from the upper part of the inlet chamber 21a, or is branched off the conduit 31, as shown.

The operation of this embodiment is quite similar to that of the embodiment of Figure 1 and will be readily understood. When first filling the filter with liquid, all valves are closed, except the inlet valve 16 and the valve 32 on conduit 31. Air is compressed under inlet pressure in storage tank 30 by the rising liquid, and when the entire filter and conduit 31 up to valve 32 are full of liquid, the valve 32 is closed.

At the end of a filter run siphon valve 41a is opened, and the outlet valve 28a and the inlet valve 16 are closed. Thereafter, the inlet chamber 21a is drained by opening the vent valve 46a and the drain valve 19. Backflow of the liquid in the elements 25 and outlet chamber 22a is prevented by the vacuum from siphon pipe 40a, as described in connection with Figure 1. When all liquid has been drained from the inlet chamber 21a, the siphon valve 41a is closed, and the valve 51 on conduit 50 opened. The air compressed in storage tank 30 expands immediately and drives the liquid in the outlet chamber 22a and the elements 25 with high velocity through the porous walls of the elements, the wash water escaping through the inlet chamber 21a and the drain 18, and carrying with it the washed-off filter aid material and dirt. Since also in this embodiment the wash liquid is discharged into a body of air, the velocity of the wash liquid is very high, and the elements are thoroughly cleaned. The embodiment of Figure 2 can also be operated by any suitable gas under pressure from an outside supply connected to storage tank 30 by gas line 33, or directly connected to conduit 50. If desired, siphon valve 41a may be kept open during filtering also in this embodiment, for the purpose described in connection with Figure 1.

In the embodiment of Figure 3 the means for applying a vacuum to the outlet chamber are replaced by mechanical means for preventing backflow of the liquid downstream of the element during draining of the inlet chamber in preparation for washing. The filter casing 10b of Figure 3 is of the same construction as the filter 10 of Figure 1, and inlet, drain, filtered liquid outlet, and gas conduits are connected thereto in the same manner, and are, therefore, not shown. No siphon pipe 40 and siphon valve 41 are used in connection with this embodiment. The gas tank 30 shown for exemplification in the other figures can also be used with this embodiment of the invention and has been omitted from the drawing.

As in the other figures, a partition 20b separates an inlet chamber 21b from an outlet chamber 22b. A vent 45b, provided with a valve 46b, leads from the inlet chamber 21b. The partition 20b has a port 26b with which an element 25b registers. While only one element 25b is shown, it will be obvious that any suitable number of elements can be provided. The element 25b of this embodiment is of the general type disclosed in Baily, Patent No. 2,595,913. As in the elements of the other figures, the filter aid coat is supported by wire helically wound over a fluted cage for support. However, in this type of element the support 60 is an impervious tube. The channels 61 between the flutes of the support 60 are closed at their tops and bottoms, as shown, and are connected with the interior of the tube 60 only by the ports 62, so that all the liquid that has filtered through the filter aid coat must flow downwardly to the ports 62, and then upwardly through the tube 60, to reach the outlet chamber 22b, and reversely, wash liquid must flow through the tube 60 and the ports 62 to reach the channels 61.

With such a filter element the liquid in the outlet chamber 22b and tube 60 can be retained during draining of the inlet chamber by providing a valve at the bottom of the tube 60. For purposes of illustration the valve disclosed in Patent No. 2,595,913 is shown herein, as it is relatively simple in construction and automatic in operation; however, other valves can be used. The valve 65 comprises a stationary stem 66 carrying a ball-shaped valve body 67, which may be integral with the stem or rigidly affixed to it, and an annular valve seat 68. The seat 68 is made of flexible material which is sufficiently stiff to withstand back pressure resulting from the head of liquid on the seat, when no inlet pressure or backwash pressure is applied, but sufficiently flexible to be distorted away from the valve by the filtering and backwash flows. In operation of this embodiment, as soon as inlet pressure ceases at the end of the filter run, the valve ring or seat 68 assumes its undistorted shape and closes the valve 65. The inlet chamber 21b can now be drained in the same manner as described in connection with Figures 1 and 2 without danger of backflow of the liquid from the outlet chamber 22b and the tube 60. There will be a backflow from the channels 61 between the flutes, and some of the filter cake will be broken off thereby. In this respect this embodiment is less desirable than the embodiments of the invention of Figures 1 and 2, where backflow is completely prevented by the vacuum applied to the outlet chamber. Further, when a filter run is interrupted, the filter aid cake will drop off the element, unless the filter is drained down to the lower end of the element 25b. However, the main object of the invention is attained also in this embodiment. When gas under pressure is released into the outlet chamber 22b and drives the liquid from the outlet chamber and the tube 60, into the inlet chamber 21b, the liquid is discharged into a body of air, rather than into liquid, resulting in a very high velocity and thorough cleaning of the filter element.

It will be seen that the new method and means for cleaning diatomite filter elements afford more efficient washing of the elements. In this method the expanding air need only accelerate the liquid in the filter outlet chamber and elements, since the air around the elements does not offer any substantial resistance to acceleration. The resulting velocity of the wash flow is much higher than in conventional "air bump" washing, where the expanding air must additionally accelerate the liquid in the inlet chamber. The invention also permits to interrupt and restart a filtering run at will without danger of the filter aid cake dropping off the element and without necessity of draining the filter.

I claim:

1. A method of washing the elements of a diatomite filter comprising the steps of withdrawing prior to backwashing of the elements the liquid from that portion of the filter upstream of the filter elements through an outlet located upstream of the filter elements, and simultaneously connecting said upstream portion of the filter to aid under atmospheric pressure to replace said withdrawn liquid with a body of air, and then passing a body of wash liquid at high velocity in the reverse direction to the filtering flow through the filter elements and into said body of air.

2. In a diatomite filter including a closed casing, an inlet conduit for liquid to be filtered discharging to said casing, a filtered liquid outlet conduit leading from said casing, means including a filter element interposed in the line of flow from said inlet to said outlet conduit and forming an inlet chamber upstream of said element and an outlet chamber downstream thereof, said chambers being connected through said element, a drain conduit leading from said inlet chamber, a vent conduit leading from said inlet chamber, a conduit for introducing gas under pressure into said outlet chamber, and a valve on each of said conduits; the combination with said filtered liquid outlet conduit of a siphon pipe leading downwardly from said filtered liquid outlet conduit to an elevation below the lower end of said element, said siphon pipe leading from a portion of said filtered liquid outlet conduit upstream of the valve on said conduit and having a small diameter relative to the diameter of said filtered liquid outlet conduit, and a valve on said siphon pipe.

3. A method of cleaning the elements of a diatomite filter comprising stopping the inflow of liquid to be filtered into, and the outflow of filtered liquid from the filter, then draining the liquid contained in the portion of the filter upstream of the element in unfiltered condition through an outlet in said upstream portion of the filter, and simultaneously connecting said upstream portion to a source of gas under atmospheric pressure to replace the liquid drained from said upstream portion by a body of such gas, and thereafter driving a body of wash liquid at high velocity through the element in reverse direction to the flow during filtering and discharging it into said body of gas in the upstream portion of the filter, and draining the wash liquid with washed off impurities and filter aid.

4. In the method of washing the elements of a diatomite filter wherein a body of wash liquid is driven by an expanding body of gas from the outlet chamber of the filter through the elements into the inlet chamber, and the filter aid coat and dirt are washed off the elements by, and removed from the filter with, the wash liquid, the improvement comprising draining at the end of the filter run and prior to backwashing of the elements the liquid contained in the inlet chamber in unfiltered condition through an outlet in said inlet chamber and replacing said liquid by a body of gas under atmospheric pressure, and thereafter discharging said wash liquid from the outlet chamber through the elements into the body of gas in said inlet chamber.

5. A method of cleaning the filter elements of a diatomite filter to remove the filter aid cake and dirt therefrom, comprising the steps, following the stopping of inflow of liquid to be filtered to and of outflow of filtered liquid from the filter, of draining, prior to backwashing of the elements, the body of liquid contained in the portion of the filter upstream of the element in unfiltered condition through an outlet in said upstream portion and replacing it by a body of gas under atmospheric pressure, while simultaneously maintaining a slight vacuum in the filter downstream of the elements to retain the filtered liquid in and downstream of the elements and prevent its backflow into said upstream portion, and, after draining of the upstream portion is completed, driving said filtered liquid in and downstream of the elements at high velocity through the elements into said body of gas in the upstream portion of the filter.

(References on following page)

References Cited in the file of this patent

UNITED STATES PATENTS

| | | |
|---|---|---|
| 430,120 | Fischer | June 17, 1890 |
| 1,771,928 | Jung | July 29, 1930 |
| 1,992,101 | Stuart | Feb. 19, 1935 |
| 2,423,172 | Booth | July 1, 1947 |
| 2,468,603 | Pew | Apr. 26, 1949 |
| 2,496,370 | Baily | Feb. 7, 1950 |
| 2,562,730 | Miller | July 31, 1951 |
| 2,570,132 | Koupal | Oct. 2, 1951 |
| 2,595,913 | Baily | May 6, 1952 |
| 2,681,153 | Ambrust | June 15, 1954 |